United States Patent [19]

Barlow et al.

[11] Patent Number: 5,150,466
[45] Date of Patent: Sep. 22, 1992

[54] FLEXIBLE DISTRIBUTED BUS PRIORITY NETWORK

[75] Inventors: George J. Barlow, Tewksbury; Donald L. Smith, Bedford, both of Mass.

[73] Assignee: Bull HN Information Systems Inc., Billerica, Mass.

[21] Appl. No.: 593,436

[22] Filed: Oct. 5, 1990

[51] Int. Cl.⁵ .......................................... G06F 13/37
[52] U.S. Cl. ..................... 395/325; 364/DIG. 1; 364/229.2; 364/242.7; 364/241.3; 364/270.5
[58] Field of Search ... 364/200 MS File, 900 MS File; 395/325

[56] References Cited

U.S. PATENT DOCUMENTS

| | | | |
|---|---|---|---|
| 4,030,075 | 6/1977 | Barlow | 364/200 |
| 4,050,097 | 9/1977 | Miu et al. | 364/200 |
| 4,096,569 | 6/1978 | Barlow | 364/200 |
| 4,402,040 | 8/1983 | Evett | 364/200 |
| 4,470,112 | 9/1984 | Dimmick | 364/200 |
| 4,556,939 | 12/1985 | Read | 364/200 |
| 4,559,595 | 12/1985 | Boudreau et al. | 364/200 |
| 4,611,276 | 9/1986 | Vinot | 364/200 |

Primary Examiner—Thomas M. Heckler
Attorney, Agent, or Firm—Faith F. Driscoll; John S. Solakian

[57] ABSTRACT

A multiprocessor system includes a system management facility (SMF) unit, a plurality of central subsystem (CSS) units, a plurality of memory subsystem units and first and second pluralities of input/output units which connect in common to a system bus. Requests are transferred between a pair of units on a distributed bus priority network included as part of the system bus on the basis of the unit's physical position on the bus relative to one end of the bus. The SMF unit positioned at the high priority end of the bus includes fast recovery bus request logic circuits which connect to the high priority request line of the priority network. Each of the CSS units positioned after the SMF unit on either side of the memory subsystems includes bus request logic circuits which connect only to the low priority request line. The memory subsystems each include bus request logic circuits which connect to both the high and low priority request lines for accepting and granting cycles from higher and lower priority units. This enables the positioning of the first and second pluralities of input/output units positioned below the memory subsystems to operate as high and low priority requestors.

8 Claims, 8 Drawing Sheets

FLEXIBLE DISTRIBUTED BUS PRIORITY NETWORK

RELATED PATENT APPLICATIONS

1. The patent application of George J. Barlow and Donald L. Smith entitled, "High Performance Round Robin Distributed Bus Priority Network," filed on Oct. 5, 1990, bearing Ser. No. 07/593,407, which is assigned to the same assignee as this patent application.

2. The patent application of George J. Barlow and Donald L. Smith entitled, "A Minimum Contention Processor and System Bus System," filed on Oct. 5, 1990, bearing Ser. No. 07/593,437, which is assigned to the same assignee as this patent application.

3. The patent application of George J. Barlow and Donald L. Smith entitled, "Cancel Mechanism for Resilient Resource Management and Control," filed on Oct. 5, 1990, bearing Ser. No. 07/593,916, which is assigned to the same assignee as this patent application.

BACKGROUND OF THE INVENTION

1. Field of Use

This invention pertains to data processing systems and more particularly to distributed bus priority systems.

2. Prior Art

There are a variety of methods and apparatuses for interconnecting the different unit controllers of a data processing system for transmitting and receiving requests over a common bus. The transfer of requests proceeds either over synchronous or asynchronous generated bus transfer cycles of operation.

U.S. Pat. Nos. 4,030,075 and 4,096,569, assigned to the same assignee as named herein, are illustrative of an asynchronous bus system. These systems have units which are coupled in a priority network which is distributed along the system bus.

In U.S. Pat. No. 4,096,569, the priority logic circuits of the distributed tie-breaking network grants bus cycles and resolves simultaneous requests to use the bus on the basis of a unit's physical position on the bus with the lowest priority being given to the last unit on the bus located at the opposite end of the bus. U.S. Pat. No. 4,559,595 discloses an improvement to the priority logic circuits of U.S. Pat. No. 4,096,569. The priority logic circuits are modified to allow the lowest priority (i.e., the last unit) to be physically at other than its lowest priority position.

In U.S. Pat. Nos. 4,493,036 and 4,600,992, priority resolver logic circuits are provided within a main memory to resolve possible conflicts between competing requests for access to memory.

These prior art arrangements have necessitated that certain types of units, such as central subsystem (CSS) units and memories, be positioned in a particular manner. It has been the practice that in order to place CSS units in both top and bottom priority positions, it was necessary to have their bus request circuits capable of making both high an low priority requests.

In such multiprocessor systems, it is desirable to also include a high speed bus which connects the CSS units and memory subsystems for high speed data transfers. In order to achieve maximum performance, it is essential to have the CSS units and memory subsystems positioned as close to each other as possible. It is also important on an asynchronous bus to position units that produce substantial bus traffic close to the high priority end of the bus, because bus cycles are shorter at those positions. This requirement made it difficult to achieve the desired performance requirements with prior art distributed priority networks.

Accordingly, it is a primary object of the present invention to provide a distributed bus priority network which enables the tight coupling of both central and memory subsystems.

A further object of the present invention is to provide a distributed bus priority system bus in which certain types of subsystems can be positioned anywhere along such system bus.

SUMMARY OF THE INVENTION

The above objects and other objects of the present invention are achieved by a preferred embodiment of a multiprocessor system which includes a plurality of identical central subsyste (CSS) units which connect to a common system bus for transferring requests including data, command and address signals between units over the bus system on a priority basis defined by a distributed or skewed priority network on the basis of a unit's physical position on the bus relative to one end of the bus. In the preferred embodiment, the skewed priority network is arranged as shown in the systems disclosed in U.S. Pat. No. 4,096,569 and in the article titled, "Extending the Megabus," by Jim Jendro, published in the September, 1983 issue of the publication Mini-Micro Systems.

The multiprocessor system further includes a system management facility (SMF) unit, a plurality of memory subsystem units, first and second pluralities of input-/output units which also connect to the system bus. Each unit has a common interface portion which includes tie-breaking network circuits which are connected to receive the physically skewed signals from the priority network and establish when the unit is to be granted access to the system bus.

The SMF unit positioned at the high priority end of the bus includes as part of its network circuits, fast recovery reset circuits which connect to a high priority request line included as part of the priority network. Each of the CSS units positionable on both sides of the memory subsystems has its network circuits connected only to a low priority request line included as part of the same priority network. The memory subsystems, each has its network circuits connected to both the high and low priority lines of the priority network for high priority accesses and for granting cycles to lower priority positioned input/output units. This enables the positioning of the first and second pluralities of input/output units positioned on the system bus below the memory subsystems to operate as high and low priority requestors.

The above arrangement allows CSS units, memory subsystems and different groups of I/0 units to be positioned any place or slot on the system bus only limited by electrical restrictions. This permits the tight coupling of CSS units and memory subsystem units to a private bus for high speed data transfers. it also enables all newer design units to be packaged within one cabinet.

The novel features which are believed to be characteristic of the invention both as to its organization and method of operation, together with further objects and advantages, will be better understood from the description in the following section when considered in connection with the accompanying drawings described in this section. It is to be expressly understood, however, that each of the drawings is given for the purpose of illustration only and is not intended as a definition of the limits of the present invention.

DETAILED DESCRIPTION OF THE PREFERRED EMBODIMENT

Overall System

Figure 1:
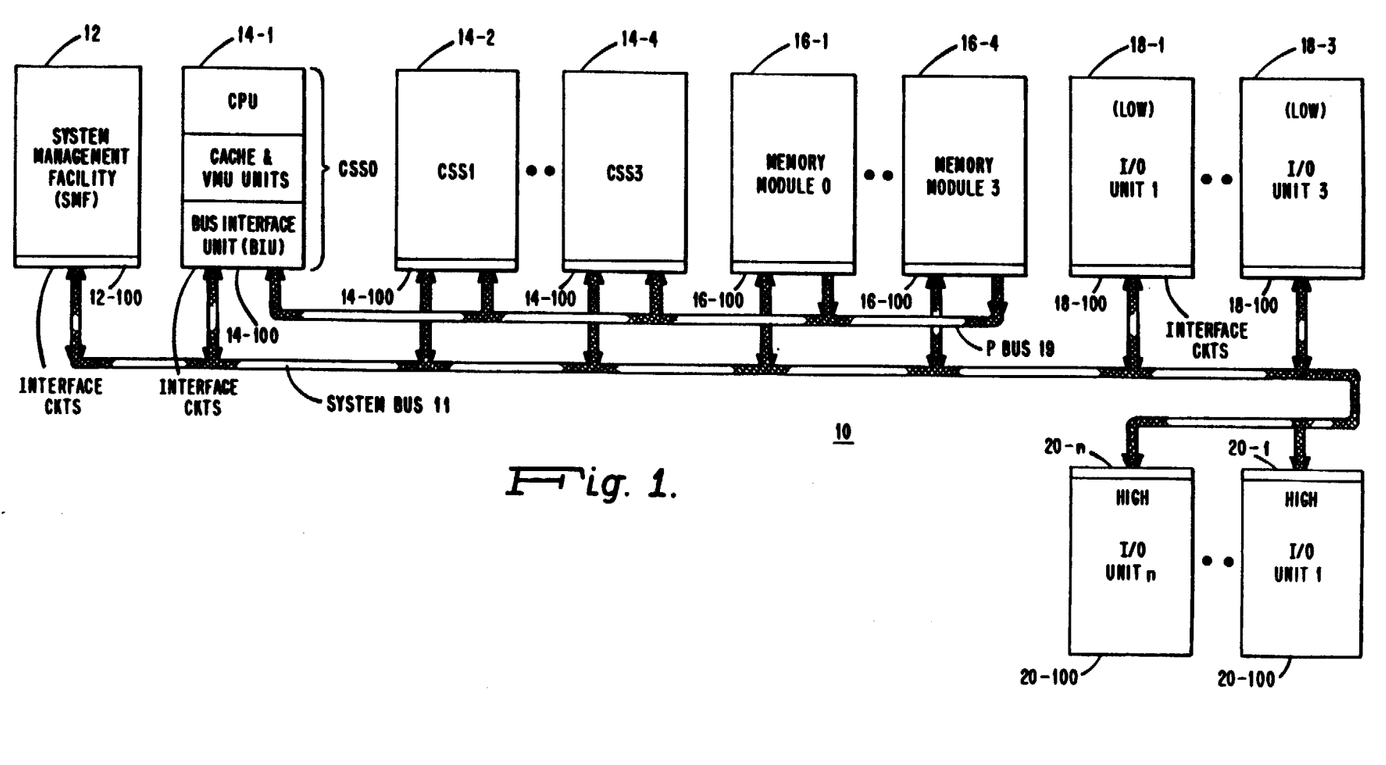
FIG. 1 is a block diagram of a multiprocessor system which incorporates the principles of the present invention.

FIG. 1 shows in block diagram form, a multiprocessor system 10 which incorporates the method and apparatus of the present invention. As shown, system 10 includes a system management facility (SMF) 12, a plurality of identical central subsystem (CSS) units 14-1 through 14-4, and a number of different subsystems 16 through 18 which are tightly coupled together by a system bus 11. The illustrative different subsystems include a number of memory subsystems 16-1 through 16-4 and a first plurality of input/output subsystems 18-1 through 18-3 connected to operate as low priority requestors. The I/O subsystems also include a second plurality of subsystems connected to operate as high priority requestors. Additionally, the CSS units 14-1 through 14-4 and memory subsystems 16-1 through 16-4 connect in common to a unidirectional asynchronous processor (P) bus 19. Each subsystem includes an interface unit (BIU) which enables the subsystem to transmit or receive requests in the form of commands, interrupts, data or responses/status to another subsystem on the system bus 11 in an asynchronous manner.

At the left end of bus 11, a termination network not shown defines the high priority end of bus 11. The SMF unit 12 which is positioned to the right of the termination network has the highest priority. Bus physical priority decreases as a function of each subsystem's distance from the termination network. The different subsystems communicate requests over system bus 11 on a priority basis defined by a distributed priority network included within system bus 11. For more detailed information regarding this arrangement, re.ference may be made to U.S. Pat. No. 4,724,519.

FIG. 1 shows a preferred embodiment of a multiprocessor system 10 which incorporates the flexible priority system bus network of the present invention. Each of the subsystems of FIG. 1 includes interface circuits which correspond to blocks 12-100 through 20-100. These circuits include differently constructed bus request logic circuits constructed according to the teachings of the present invention.

Figure 2A:
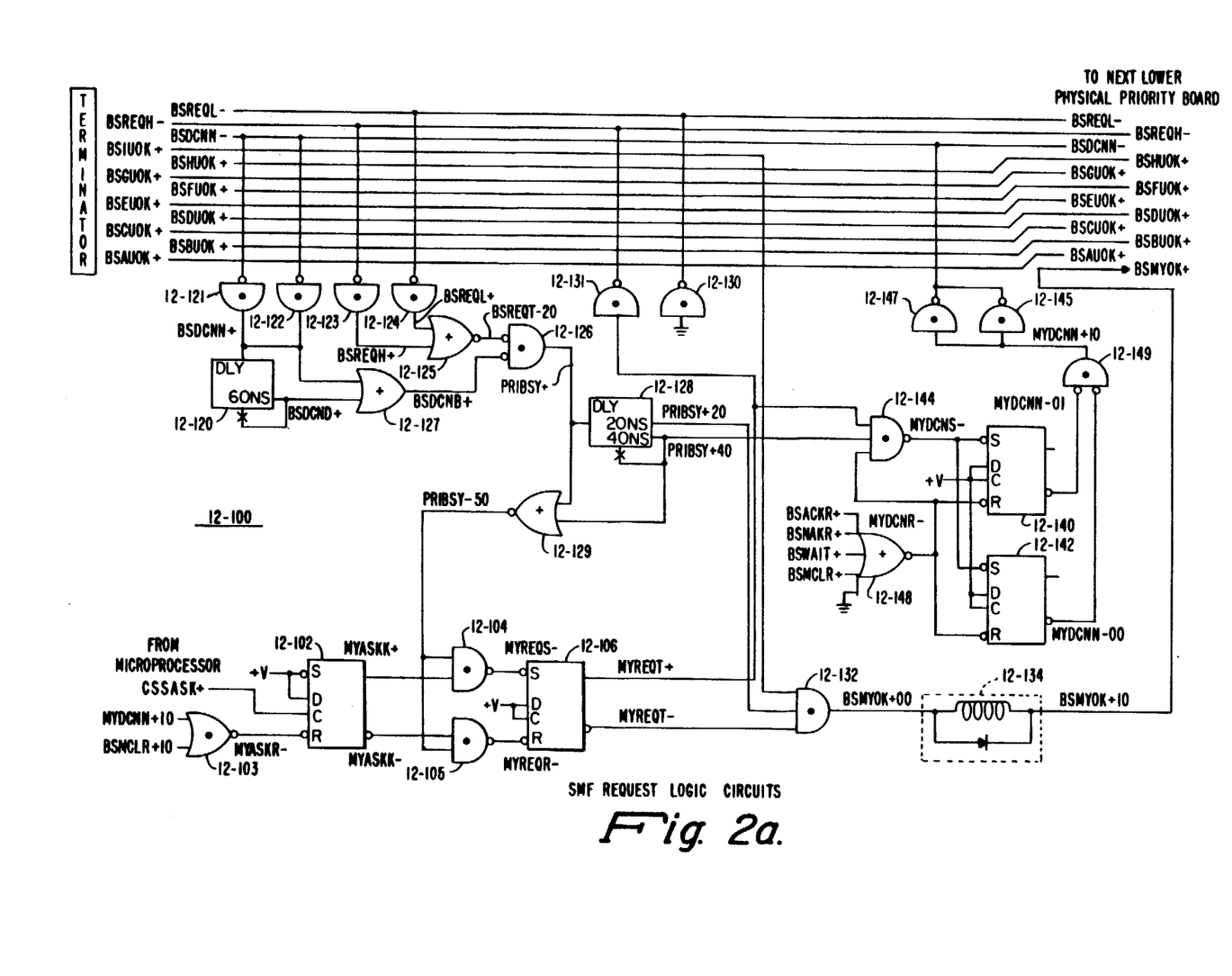
FIGS. 2a through 2d show in greater detail, the interface circuits of the different units of FIG. 1.

SMF Unit Request Logic Circuits - FIG. 2a

FIG. 2a shows in greater detail, the SMF unit bus request logic circuits 12-100 which connect to system bus priority network 11-1. As seen from FIG. 2a, the circuits 12-100 include a user ask flip-flop 12-102 which connects to a my request flip-flop 12-106 and associated NOR and NAND gates 12-103, 12-104 and 12-105 arranged as shown.

The user flip-flop 12-102 is set in response to a request signal SMFASK +00 signal generated by a microprocessing unit included within the SMF unit 12. This in turn causes my request flip-flop 12-106 to be switched to a binary ONE state which applies a my request signal MYREQT+ to a high priority bus request line BSREQH— of system bus priority network via a NAND gate 12-130. This circuit arrangement improves the recovery time of the high request line circuits of system bus 11 in that the my request circuits are reset in the same manner as the other high priority subsystems request logic circuits (i.e., memory subsystems). As shown, these circuits are reset via NOR gate 12-103 in response to my data cycle now signal MYDCNN+10 in addition to a bus master clear signal BSMCLR+10.

The logic circuits 12-100 further include priority network input circuits corresponding to circuits 12-120 through 12-134 which form a part of the distributed priority network of system bus 11. These circuits operate with the priority network (prinet) input circuits of other subsystems to resolve conflicts between competing external requests received in the form of signals BSREQL+ and BSREQH+.

Based upon any conflict, the priority input circuits generate signals PRIBSY—50 and BSMYOK+10. Since SMF unit 12 is positioned at the highest physical priority slot, signal BSIUOK+ is always a binary ONE. The signal BSMYOK+10 when forced to a binary ONE signals that SMF unit 12 is granting permission to use system bus 11 to any other unit of lower priority. This signal is applied as one of the physically skewed or diagonal lines corresponding to the set of priority signals used by each unit connected to system bus 11. For further information as to how the distributed priority network is constructed, reference may be made to U.S. Pat. No. 4,096,569 and the article titled "Extending the Megabus" by Jim Jendro published in the September, 1983 issue of the publication "Mini-Micro Systems."

Additionally, the priority network input circuits in response to a bus data cycle now signal BSDCNN+ generates a bus delayed signal BSDCNB+ which is applied as one inverting input of an AND gate 12-126. The other inverting input of AND gate 12-126 receives bus request signal BSREQT—20. AND gate 12-126 generates prinet busy signal PRIBSY+ in the presence of either a low or high priority bus request.

As shown, SMF request logic circuits 12-100 also ihclude grant circuits corresponding to circuits 12-140 through 12-149 arranged as shown. The grant flip-flop is implemented as two parallel flip-flops so as to provide additional fan-out. In response to my request signal MYREQT+ and when the prinet network is busy (signal PRIBSY+40=1), NAND gate 12-144 generates my data cycle now set signal MYDCNS—. Signal MYDCNS— is used to set the SMF grant flip-flops 12-140 and 12-142. This results in the generation of my data cycle now grant signal MYDCNN+10 which is applied to system bus 11 via the driver circuits 12-145 and 12-147.

As shown, grant flip-flops 12-140 and 12-142 also receive bus acknowledgement, negative acknowledgement, wait response signals (BSACKR+, BSNAKR+, and BSWAIT+) in addition to bus master clear signal (BSMCLR+). These signals are used to reset the user grant flip-flops 12-140 and 12-142 in a conventional manner following the receipt of a response to the transmitted request by the unit designated in the request. In the system of the preferred embodiment, as explained herein, the system bus 11 communication proceeds on a master-slave basis. That is, any subsystem desiring to communicate requests a bus cycle which is granted on a priority basis. When the bus cycle is granted, that subsystem becomes the master and may address any other subsystem on the system bus as the slave.

The addressed or slave subsystem can make any one of the above three possible responses (i.e. ACK, NACK, or WAIT). Any one of these responses causes the grant flip-flops 12-140 and 12-142 to be reset. For further information regarding these responses, reference may be made to the previously referenced patents as well as U.S. Pat. No. 4,559,595.

Figure 2B:
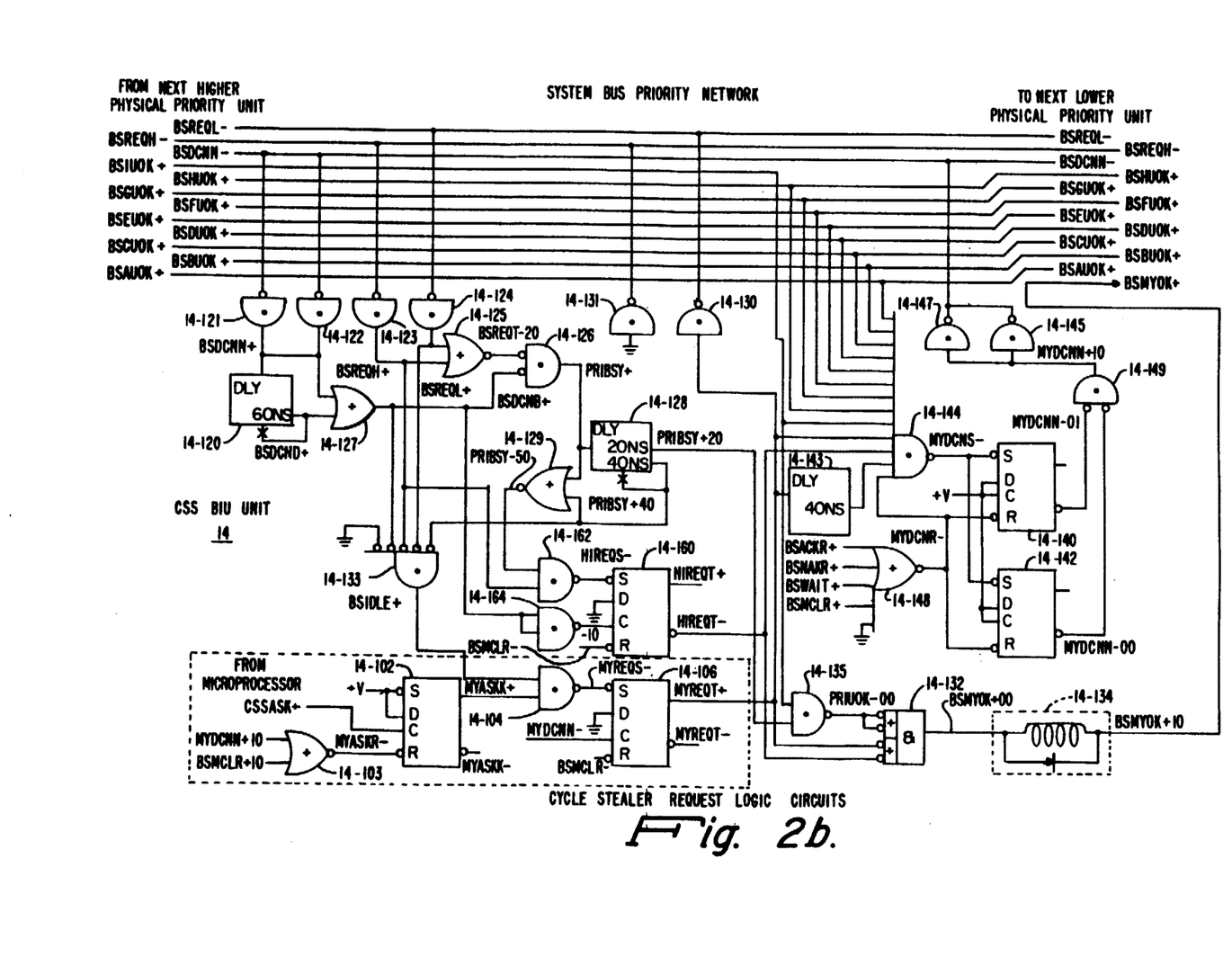

CSS Unit Request Logic Circuits—FIG. 2b

FIG. 2b shows in greater detail, the CSS unit cycle stealer request logic circuits 14-100. These request logic circuits are used by all CSS units and do not request a bus cycle unless no other subsystems are making requests. Once a CSS unit decides to make a bus request, it is made at a low priority and the request continues to be made until a cycle is granted. Unlike high or low priority requestors (e.g. I/O units), CSS units reset their my request (MYREQT) flip-flops when a wait response is received.

It will be noted that there are a number of similarities between the SMF unit bus request logic circuits and the CSS request circuits 14-100. These are noted through the use of similar reference numerals in both figures.

The MYREQT flip-flop 14-106 of FIG. 2b is enabled via bus idle signal BSIDLE+ indicating that there are no other requests, when signal BSDCNN+ has been forced to an inactive state (i.e. binary ZERO) and has been in that state for a period of at least 60 nanoseconds (i.e. delay time of delay circuit 14-120) and signal PRIBSY+ has been inactive state for a period of at least 40 nanoseconds as defined by the delay line 14-128. Also, my request (MYREQT) flip-flop 14-106 is reset whether or not the slave response was a BSWAIT.

Signal MYREQT+ is gated onto the bus on to the low priority request line BSREQL— and a CSS unit never uses the high priority request line BSREQH—. The signal MYREQL+ is delayed by delay circuit 14-143 for 40 nanoseconds and is applied as an input to NAND gate 14-144 for generating signal MYDCNS—. This ensures a minimum of 40 nanoseconds between the time for requesting a bus cycle and being granted a bus cycle. Other inputs to NAND gate 14-144 include the prinet positional signals BSAUOK+ through BSIUOK+.

A high priority request flip-flop 14-160 and associated NAND gate circuits 14-162 and 14-164 have been included which enables the CSS cycle stealing bus request logic circuits to refuse acceptance of the granted bus cycle passing it onto a lower priority unit. This is done in a manner which does not disturb the normal round robin sequencing of the CSS units. This arrangement is described in greater detail in the related copending patent application entitled, "High Performance Round Robin Distributed Bus Priority Network."

Figure 2C:
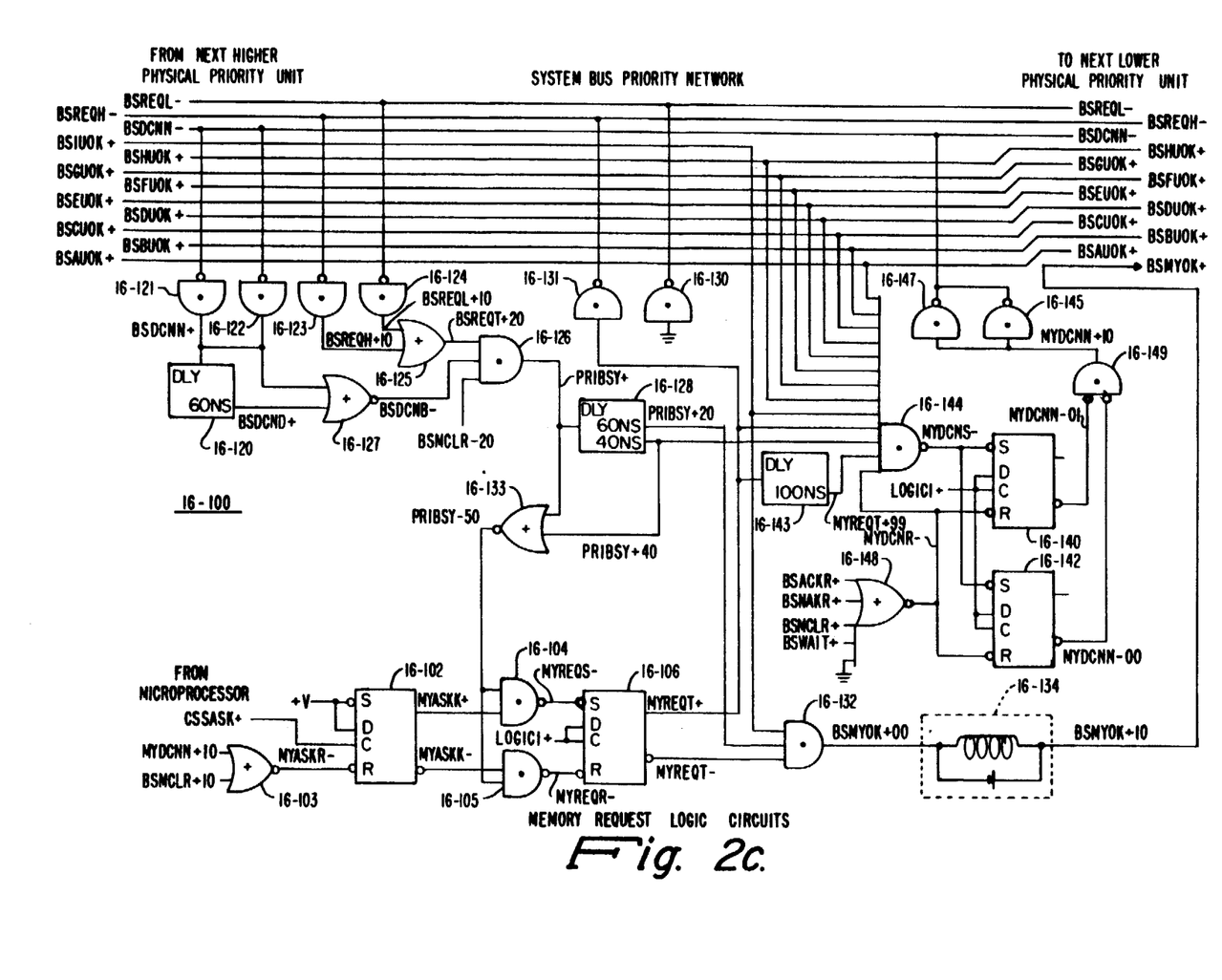

Memory Request Logic Circuits—FIG. 2c

The memory request logic circuits 16-100 of FIG. 2c are similar to the SMF unit request logic circuits 12-100. Reference numerals have been used to so indicate. Memory subsystems reset their MYASK and MY-REQT flip-flops 16-102 and 16-106 early in the data cycle to allow extra time for line BSREQH to recover before the next cycle as in the case of the SMF bus request logic circuits.

The MYREQT flip-flop 16-106 is cleared approximately 50 nanoseconds after signal PRIBSY+ is cleared to ZERO at the end of the priority resolution cycle. This is done since no other subsystem is allowed to respond to a request with a BUSWAIT. The signal 15. MYREQT+ is delayed by 100 nanoseconds before enabling NAND gate 16-144 to generate signal MYDCNS—. This ensures a minimum of 100 nanoseconds of time between requesting a bus cycle and being granted a bus cycle. Also, as shown, the gate 16-144 connects to the prinet network for receiving positional signals BSAUOK+ through BSIUOKO+.

Figure 2D:
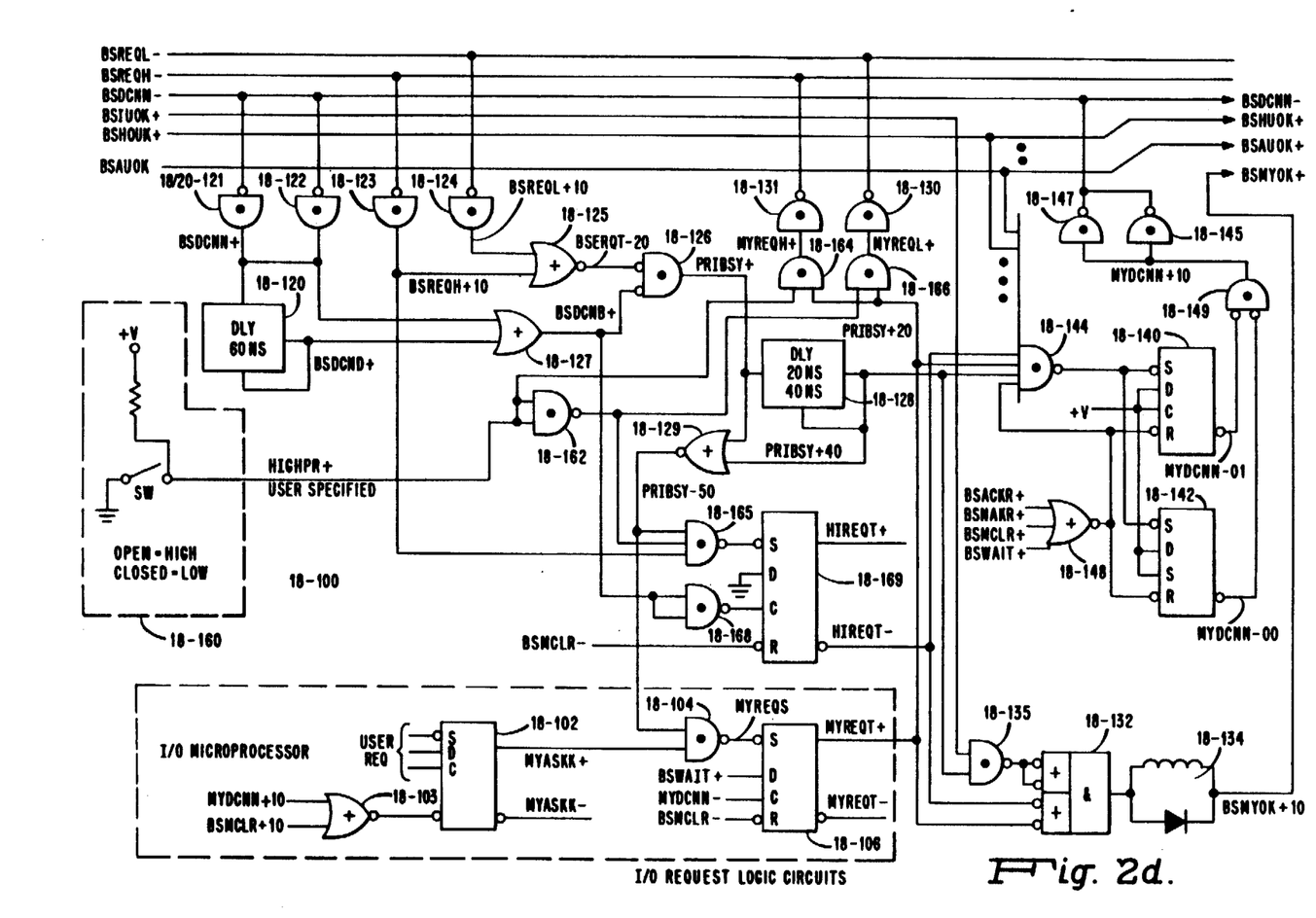

I/O Request Logic Circuits—FIg. 2d

The I/O request logic circuits 18-100 and 20-100 are similar to the other request logic circuits. However, it will be noted that the I/O subsystem is connected to provide a high priority signal HIGHPR+ specifying which request line (i.e. BSREQH or BSREQL) is to used for requesting bus cycles. Usually, I/O subsystems which are not fully buffered are connected as a high priority requestor by placing a switch 20-160 in an open position. This forces signal HIGHPR+ to an active or a binary ONE state. This in turn causes AND gate 20-16 to force high priority request signal MYREQH+ to an active state when my request flip-flop 20-106 is set to a binary ONE as a result of a request having been received from the I/O microprocessor.

In newer or fully buffered units, a switch 18-160 equivalent to switch 20-160 is placed in a closed state. This forces signal HIGHPR+ to an inactive or a binary ZERO state. Thus, such I/O subsystems are connected to operate as low priority requestors. That is, signal HIGHPR+ when a binary ZERO causes NAND gate 20-162 equivalent to gate 20-162 to force low priority request signal MYREQL+ to an active state when my request flip-flop 18-106 (equivalent to 20-106) to a binary ONE in response to an I/O request.

A high priority request flip-flop 18-169 and associated gate circuits 18-165 and 18-168 have been included to enable a high priority request to preempt low priority requestors relative to their accessing system bus 11.

Briefly, the timing for setting this flip-flop is provided by signal PRIBSY-50 which is the same as for MY-REQT flip-flop 18-106. Therefore, the HIREQT flip-flop 18-169 can be set during the first 45 nanoseconds of a priority resolution cycle. The HIREQT flip-flop is set when another subsystem makes a high priority bus request (BSREQH+ = 1) and while the I/O unit is low priority (HIGHPR+ = 0). The signal HIREQT— is applied as an input to NAND gate 18-144 preventing acceptance of the next bus cycle when the HIREQT flip-flop 18-169 it set. Also, signal HIREQT— is "NORed" with signal MYREQT+ in the gate 18-132 which enerates output prinet signal BSMYOK+10. Therefore, the grant signal is generated when the HIREQT flip-flop 18-169 is set independent of signal MYREQT. The HIREQT flip-flop 18-169 is reset 60 nanoseconds after the trailing edge of signal BSDCNN and is also reset by bus clear signal BSMCLR—.

My request flip-flop (MYREQT) 18-106 is cleared at the trailing edge of signal MYDCNN+ only if the system bus response is not a wait (BSWAIT+ =0) so the I/O subsystem unit will immediately retry the bus operation.

DESCRIPTION OF OPERATION

Figure 3A:
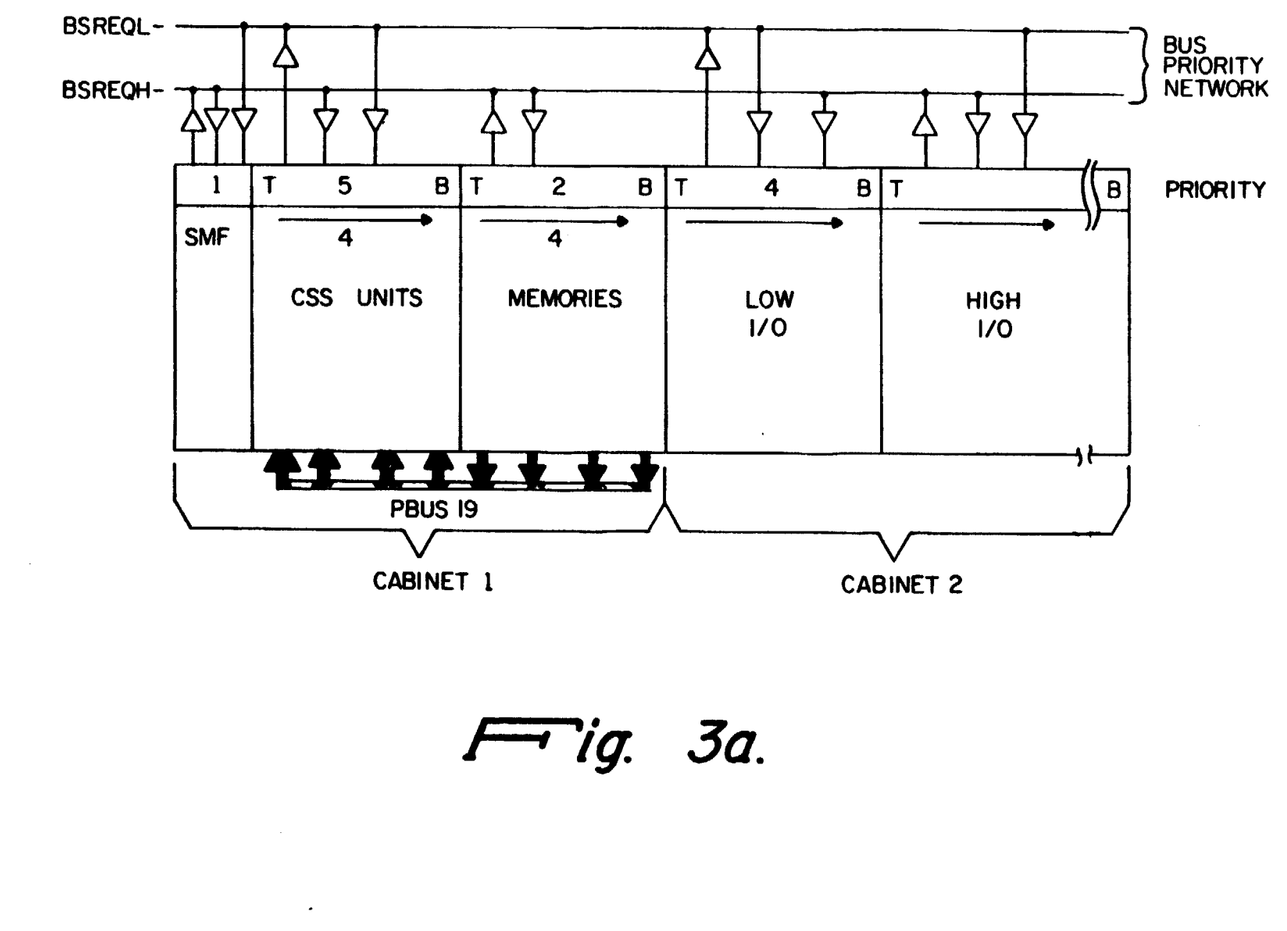
FIGS. 3a through 3c are used to describe the organization of the priority network structure of the present invention.

With reference to the drawings of FIGS. 3a and 3c, the operation of the preferred embodiment of the present invention will now be described. FIG. 3a shows a particular arrangement of subsystems and their connections to the high and low priority request lines BSREQH and BSREQL of the bus priority network of system bus 11. It also shows an arrangement which enables the CSS subsystems to be positioned as close to the memory subsystems as possible, and as close to the high physical priority end of the bus as possible. This arrangement allows blocks of data to be transferred via the private bus 19 as fast as possible. It enables high performance I/O subsystems (that utilize many bus cycles) to be placed at higher positional priorities on the bus than the high priority I/O subsystems, while still allowing low performance (but high priority) I/O subsystems access to the bus when they require it. It also enables high priority I/O units or subsystems 20-1 through 20-n to be placed into a separate cabinet.

Figure 3B:
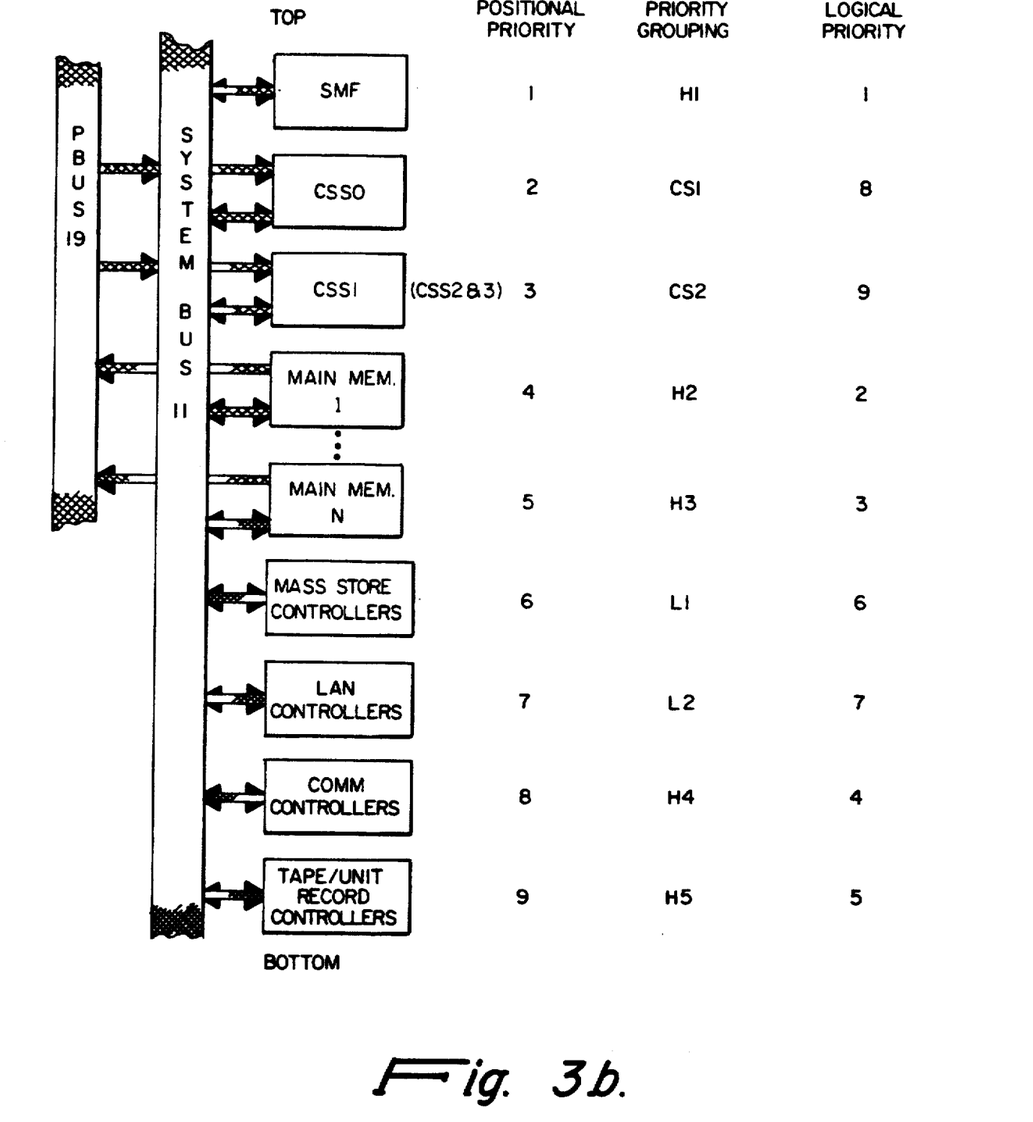
Figure 3C:
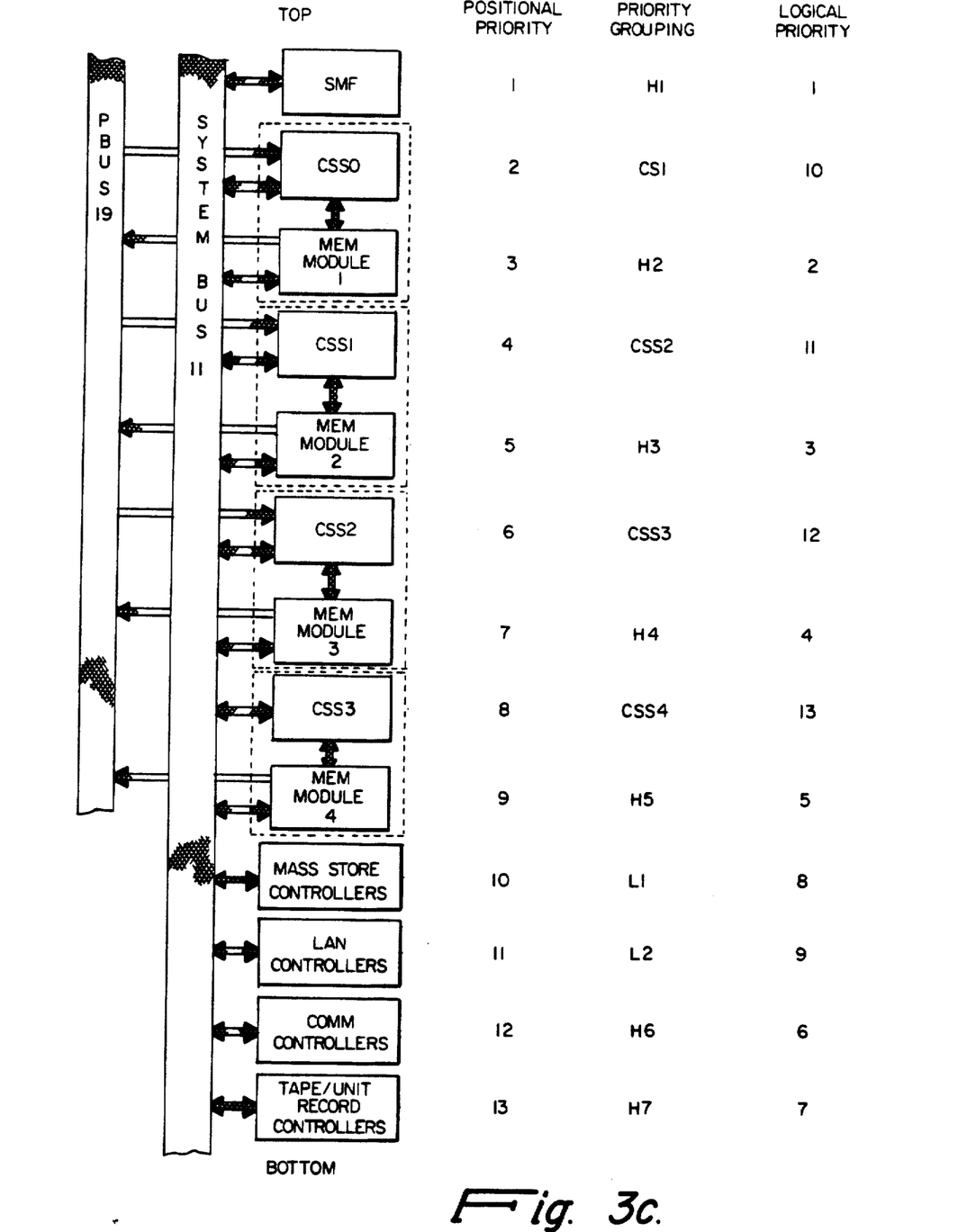

FIG. 3b illustrates the positional priority arrangement of subsystems of FIG. 3a. It also defines the positional priority and logical priority of each subsystem of FIG. 3a. FIG. 3b illustrates the positional priority arrangement of the preferred embodiment of the multiprocessor system of FIG. 1. It also indicates the specific priority allocation and logical priority.

In general, it becomes necessary to provide or allocate certain bus priorities among the different subsystems based on their relative functioning within system 10. In this system, the SMF unit 12 has the highest priority for system integrity and control purposes but presents a very low duty cycle in contrast to other subsystems. Therefore, it is allocated the highest positional priority and is connected as a high priority requestor. The memory subsystems are allocated the next highest priority, the I/O subsystems next and the CSS subsystems the lowest priority. Heretofore, this has placed certain limitations relative to the specific configurations or organizational structures, because of the priority positional structure of the system bus. The present invention removes such limitations while still enabling bus operations to proceed in the same overall manner.

In the multiprocessor system of FIG. 1, the sequencing of the subsystem boards has been organized in a predetermined manner. Logic circuits and the connections to the high and low priority bus lines enable groups of subsystems to be positioned anywhere along system bus 11 and have the subsystems assume a given positional priority independent of the top to bottom positional structure of bus 11. However, within each group of subsystems, the top to bottom positional structure of bus 11 still is used to define the relative positional priorities of the member subsystem within the group. For example, in the case of the CSS subsystems, these subsystems can be positioned anywhere along bus 11, but still are able to maintain their standard mode of operation which is operating on a cycle stealing basis and in a round robin fashion, in the case where more than one CSS subsystem simultaneously requests access to system bus 11. That is, in the case of simultaneous requests, the group of CSS subsystems would start performing a round robin sequence of bus cycles, in which each CSS subsystem in turn would be granted a bus cycle according to its positional priority on the bus.

The memory subsystem and I/O subsystem groups would also sequence in the same manner within their respective groups. These groups do not grant cycles in a round robin fashion, in the case of simultaneous accesses. For example, in the low priority I/O subsystem group, the subsystems only "win access" to bus 11 in the absence of a high priority I/O request and sequence from top to bottom which in FIG. 3b is from left to right. These I/O subsystems again assume the relative positional priorities indicated in FIG. 3b.

The present invention recognizes that by using timing which overcomes any electrical constraints, so that high priority and low priority request signals can be properly recognized, this provides four possible states. There is a state where if there is no high priority request and no low priority request, system bus 11 is in an idle state. This state is used by the bus request logic circuits of the CSS subsystems for contending among each other for the next bus cycle, access to system bus 11. Such next bus cycle is passed along within the CSS subsystem group. In greater detail, the bus idle logic circuit corresponding to gate 14-133 enables each CSS subsystem to identify at the correct time that there are no high priority requestors or low priority requestors on the bus. This enables the CSS subsystems to turn on their my request flip-flops.

Within the CSS subsystems, when their my request flip-flops are turned on, in an active state, they will sequence granting cycles from top to bottom. As each CSS subsystem turns its low priority request flip-flop on, the low priority request is broadcasted to bus 11 so as to prevent any other (lower or higher priority positioned) subsystems within the group from joining in or attempting to access the bus 11. As each CSS subsystem is granted a bus cycle, the subsystem turns off its my request flip-flop. That is, the subsystem removes its input to the low priority request line while the other low priority CSS requests remains present. This causes the round robin sequencing. That is, as long as any CSS subsystem has its request flip-flop on, there will be a low priority request outstanding on the bus. This prevents the CSS subsystems previously granted cycles from again setting their my request flip-flops (BSIDLE≠1).

The arrangement accomplishes the above as follows. The CSS subsystems are prevented from using system bus 11, except when it is in an idle state and during the interval that the bus is in an idle state, cycles are granted to the CSS subsystems which make simultaneous requests in a round robin fashion.

The CSS subsystems further include a high priority request flip-flop which, at the end of every bus cycle granted to a CSS subsystem, stores an outstanding high priority request which breaks into the round robin sequence causing the CSS subsystems to lose the next bus cycle which is won by a high priority requestor to win that next bus cycle. This arrangement is the subject of related patent application titled, "A Minimum Contention Processor and System Bus System."

The CSS subsystems have the lowest priority within the multiprocessor system 10. The group having the next higher priority is the I/O subsystems which include the high/low priority bus request logic circuits of FIG. 2d. These include mass storage controllers and LAN controllers which are required to be positioned as close to the memory subsystems as possible to perform high speed DMA transfers and are fully buffered. These subsystems tend to be low priority in that there are very few reasons in terms of real time demands why these subsystems must complete their bus transfers. Thus, they fall into the category of high rate data transfer, low priority controllers.

These subsystems are allowed to make bus requests even if the bus 11 is busy. They are granted access to the bus only in the absence of a high priority request. By including circuits within the bus request logic circuits of each I/O subsystem which captures a high priority request and by not permitting such subsystems to "win the bus" in the presence of such a high priority request, it is possible to have memory subsystem requests, SMF unit 12 requests, and high priority I/O subsystem requests to take precedence over the requests made by low priority I/O subsystems. Thus, within each low priority subsystem, the circuits detect the presence of a high priority request and will turn on its high priority request flip-flop. When the high priority request flip-flop is switched on, it prevents the I/O subsystem from accepting or being granted the next bus cycle. In the absence of any high priority request, the I/O subsystem is able to make a low priority request and "win the bus." It can continue to make requests and have every bus cycle it requests granted, until it finishes all of its I/O transfers.

The next highest level of priority on the bus is the high priority I/O subsystems. These include older, non-buffered I/O subsystems with real time requirements. When the bus request logic circuits of FIG. 2d are switched over to the high priority state, this enables each subsystem of the group to present its requests via the high priority request line. This disables the high priority request flip-flop so it cannot prevent the I/O subsystem from "winning" the bus.

Thus, the group of high priority I/O subsystems 20-1 through 20-n are allowed to make high priority requests on bus 11. However, the I/O subsystems are placed near the bottom or to the right in FIG. 2b giving them a lower positional priority relative to other high priority requestors, such as SMF unit 12 and memory subsystems. In the absence of SMF unit 12 or one of the memory subsystems being granted the next bus cycle, the prinet permission (BSAUOK-BSIUOK) signals are passed down to the high priority I/O subsystems to grant them the next bus cycle.

It will be noted that each of the memory subsystems includes similar high priority bus request logic circuits. Each memory subsystem is able to turn on its my request flip-flop which results in a high priority request being applied to system bus 11. However, it does not include a high priority request flip-flop since the only subsystem which can have priority over such subsystems ar those having higher positional priority on bus 11. As shown, these subsystems correspond to other memory subsystems and SMF unit 12. There are no restrictions placed on each memory subsystem relative to its requesting access to bus 11 (i.e., not a cycle stealer) and no restriction relative to its "winning the bus" (i.e., not a low priority I/O subsystem). The memory subsystems are placed in the middle of the bus 11 enabling it to "win the bus" over the lower priority positioned high priority I/O subsystems and loses cycles to requests made by the higher priority positioned SMF unit 12.

The SMF unit 12 has the highest priority bus position as indicated in FIG. 2b. It is always plugged into the highest bus slot next to the termination block circuits. Because there are no input permission bus signals applied as inputs to its grant flip-flops, it is able to grant itself bus cycles. Also, being able to recover the high priority bus signal and enabling proper decoding of high priority requests like a memory subsystem, it is essential that all high priority subsystems clear out requests in a consistent or like manner any time they have been granted a bus cycle. This is accomplished by the pair of series connected ASK and MYREQT flip-flops. As soon as any my data cycle now signal is generated indicating that a bus cycle has been granted, the ASK flip-flop is cleared to ZERO. The timing circuits at the end of the bus cycle, the binary ZERO contents of the ASK flip-flop are loaded into the MYREQT flip-flop resetting it to ZERO.

Thus, FIG. 3b shows a particular organization of subsystems which have been configured to meet certain timing circuit limitations. However, the teachings of the present invention can be applied to other organizations of subsystems, such as to a multiprocessor system which, in lieu of a private system bus, has pairs of CSS and memory subsystems packaged together as shown in FIG. 3c. That is, there is no requirement that CSS Here, the subsystems have the indicated positional and logical priorities.

The only requirement is that the CSS subsystems are connected to the bus priority network in the above described manner, so that they will be allowed bus access when it is in an idle state. Also, CSS subsystem 14-1 has priority over CSS 14-2 if both simultaneously request bus access and tie-breaking becomes necessary. The physical characteristics of system bus 11 do not in any way require that these subsystems be positioned adjacent to one another. The organization of FIG. 3b provided a convenient packaging of CSS and memory subsystems within a single cabinet for maximizing private bus transfers. In the case of the organization of FIG. 3c, individual, private buses are positioned between pairs of CSS and memory subsystems making it more desirable to organize the different subsystems more according to their functions.

Thus, as the buses become more global in structure, the groups of subsystems can be organized and positioned on system bus 11 according to function (CPU, memory, I/O), for accommodating their data processing needs and transfer requirements on a priority basis. This is accomplished through the assigning of both positional and logical priorities which enables groups of different types of subsystems to be flexibly positioned on a system bus.

While in accordance with the provisions an statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. Apparatus for enabling units of a multiprocessor system to be connected to a common system bus for high performance operation, said bus includes a distributed priority network, said system comprising a system management facility (SMF) unit, a plurality of central subsystem (CSS) units, a plurality of memory subsystem units and first and second pluralities of input/output system units which connect in a predetermined order to different physical positions along said common system bus for asynchronously transferring requests between different ones of said units, the transferring of requests proceeding on a priority basis controlled by a plurality of like priority network bus request interface sections, one of said sections being included in a different one of said plurality of units and in which said interface sections collectively form said distributed bus priority network of said common system bus for granting access to said bus on the basis of each unit's physical position on said common system bus relative to one end of said bus as indicated by positional priority signals received and generated by corresponding ones of said priority network sections included in said units, said apparatus including:

first bus request logic circuits included in the interface section of said SMF unit which connects to said one end so as to have a highest positional priority, said first bus request logic circuits including input circuit means for detecting when either a high or low priority request has placed said priority network in a busy state, and fast recovery bus request circuit means connected tos aid input circuit means and to said bus priority network for applying high priority requests when said priority network is not busy to said system bus to be granted bus cycles without restriction and for being reset at the end of each bus cycle granted to said SMF unit;

second bus request logic circuits included in each interface section of each CSS unit which connects between said SMF unit and either side of said memory subsystem units, said second bus request logic circuits including input circuit means for detecting when either a high or low priority request has placed said priority network in a busy state and detector circuit means for generating an output signal for indicating when no high or low priority requests are being applied by said units to said bus priority network thereby indicating that said system bus is in an idle state, and bus request circuit means connected to said second bus request logic circuits and to said bus priority network for applying low priority requests to said system bus when said priority network is not busy only when said output signal indicates that said system bus is in said idle state and being granted bus cycles as a function of said positional priority signals; and, third bus request logic circuits included in each interface section of each memory subsystem unit, said third bus request logic circuits including input circuit means for detecting when either a high or low priority request has placed said priority network in a busy state, and bus request circuit means connected to said third bus request logic circuits and to said bus priority network, for applying high priority requests to said system bus when said priority network is not in a busy state and being granted bus cycles as a function of said positional priority signals so as to provide a desired logical priority among said units based upon the functions performed by said units independent of physically positioning said units for high performance operation.

2. A method for enabling the different types of functional units of a multiprocessor system including memory, central processing and input/output processing subsystem units to be logically connected to a common system bus in a flexible manner to operate at high performance, said system bus including a distributed priority network wherein each of said functional units connect to different physical positions along said system bus for asynchornoulsy transferring requests between different ones of said units, said transferring proceeding on a priority basis established by like priority network bus request interface sections included in said units which collectively form said distributed priority network for granting access to said bus on the basis of each unit's physical position relative to one end of said bus indicated by positional priority signals generated and received by corresponding ones of said network sections, said method including the steps of:

(a) connecting a first type of functiona lunit required for control purposes to the highest priority at the end of each bus cycle granted for providing fast recovery for high priority requests;

(b) connecting a plurality of second type of functional units corresponding to central processing units to be positioned between said first type of functional unit and third type of functional units so as to maximize performance, including circuits in said interface section of each second type of functional unit for detecting when either a high or low priority request has placed said priority network in a busy state and for detecting when said system bus in in an idle state and including bus request circuits for applying low priority requests to said system bus when said priority network is not busy and only when said system bus is in said idle state and for being granted a requested bus cycle as a function of said positional priority signals; and, (c) connecting said third type of functional units at a central portion of said system bus, including bus request circuits in said itnerface section of each third type of functiona lunit for detecting when either a high or low priority request has placed said priority network in a busy state and including bus request circuits for applying high priority requests to said system bus when said priority network is not busy and for being granted requested bus cycles as a function of said positional priority signals thereby providing a logical priority based upon the function performed by said units independent of their different positional priorities.

3. Apparatus for enabling the flexible connection of units of a multiprocessor system including a plurality of central subsystem (CSS) units, a number of memory subsystem units and first and second pluralities of input/output (I/O) subsystems connected to a system bus for high performance whereins aid first and said second pluralities of input/output (I/O) subsystem units which normally connect to said system bus in a predetermined order, have predetermined positional priorities based on each unit's physical position relative to a specific high end of the system bus, said apparatus including:

a first type of bus request logic circuits included in each CSS unit which connects at a first predetermined position relative to said high priority end of said bus and said memory subsystem units, said first type of bus request logic circuits being connected to said system bus and only allowing said each CSS unit to generate a low priority request for a bus cycle on a cycle stealing basis when said bus is in an idle state; and, a second type of bus request logic circuits included in each memory subsystem unit, said second type of bus request logic circuit being connected to said system bus at a relative high priority position relative to said one end and allowing said each memory unit to generate a high priority request for a bus cycle only when said bus is not in a busy state and to be granted bus cycles as a function of said positional priority signals.

4. The system of claim 3 wherein said apparatus further includes a third type of bus request logic circuits included in each I/O subsystem units, said request logic circuits of each of said first plurality of I/O subsystem units positioned at higher priority positions relative to said second plurality of I/O subsystem units being connected to said system bus at a second predetermined position relative to said high priority end and allowing said each I/O subsystem to generate a low priority request only when said bus is not in a busy state and being granted bus cycles as a function of said priority signals.

5. The apparatus of claim 4 wherein said third type of bus request logic circuits included in each I/O subsystem unit of said second plurality of I/O units is connected to said system bus at a third predetermined position relative to said high priority end and allows said each I/O subsystem to generate a high priority request only when said bus is not in a busy state and being granted bus cycles as a function of said priority signals.

6. The system of claim 3 wherein said first predetermined position corresponds to a bus position which is located on either side of one of said memory subsystems so as to maximize high performance data transfers between CSS subsystem units and said memory subsystems.

7. The system of claim 4 wherein said second predetermined position corresponds to a bus position which is close to said high priority end of said bus and to said memory subsystems.

8. The system of claim 5 wherein said third predetermined position corresponds to a bus position which is as far away from said high priority end as possible.

* * * * *